US011746300B2

(12) United States Patent
Richardson et al.

(10) Patent No.: US 11,746,300 B2
(45) Date of Patent: Sep. 5, 2023

(54) HIGH PRESSURE OIL TREATMENT PROCESS

(71) Applicant: Bell Engineering, Inc., Orange, TX (US)

(72) Inventors: Robert Richardson, Beaumont, TX (US); Tyler Briggs, Beaumont, TX (US); Brint Bridegam, Orange, TX (US)

(73) Assignee: Bell Engineering, Inc., Beaumont, TX (US)

( * ) Notice: Subject to any disclaimer, the term of this patent is extended or adjusted under 35 U.S.C. 154(b) by 112 days.

(21) Appl. No.: 17/090,831

(22) Filed: Nov. 5, 2020

(65) Prior Publication Data

US 2021/0130706 A1 May 6, 2021

Related U.S. Application Data

(60) Provisional application No. 63/052,378, filed on Jul. 15, 2020, provisional application No. 62/931,039, filed on Nov. 5, 2019.

(51) Int. Cl.
*C10G 53/02* (2006.01)
*C10G 33/00* (2006.01)
*B01D 3/14* (2006.01)
*B01D 3/00* (2006.01)
*B01D 17/04* (2006.01)

(52) U.S. Cl.
CPC ............. *C10G 53/02* (2013.01); *B01D 3/007* (2013.01); *B01D 3/148* (2013.01); *B01D 17/045* (2013.01); *C10G 33/00* (2013.01); *C10G 2300/1033* (2013.01)

(58) Field of Classification Search
CPC .................. C10G 53/02; C10G 33/00; C10G 2300/1033; B01D 3/007; B01D 3/148; B01D 17/045
See application file for complete search history.

(56) References Cited

U.S. PATENT DOCUMENTS 8,992,838 B1 * 3/2015 Mueller ............. B01D 53/1406
422/129
2018/0187095 A1 * 7/2018 Soliman ............. B01D 19/0068
2020/0346140 A1 * 11/2020 Soares da Silva . B01D 21/2444

* cited by examiner

*Primary Examiner* — Prem C Singh
*Assistant Examiner* — Brandi M Doyle

(57) ABSTRACT

A method and apparatus for separating production fluids using a system designed to minimize the heating requirements through thermodynamic efficiency and reduce equipment costs.

12 Claims, 9 Drawing Sheets

HIGH PRESSURE OIL TREATMENT PROCESS

RELATED APPLICATIONS

This application claims priority to U.S. Provisional Application No. 62/931,039, filed Nov. 5, 2019 and U.S. Provisional Application No. 63/052,378, filed Jul. 15, 2020.

BACKGROUND OF THE INVENTION

Field of Invention

The present disclosure relates to a process and related apparatuses to condition unstabilized produced crude oil at elevated pressures in hydrocarbon surface production, meeting a vapor pressure threshold to ensure safe processing, transport, and/or storage.

Background

Crude oil, such as that produced from tight shale plays, can contain abundant amounts of volatile light organic compounds such as methane, ethane, propane, and butanes and other light organic compounds in solution. The presence of these volatile compounds, in a large enough amount, can cause an unstable increase in the vapor pressure of the liquid creating a risk of off-gassing, overpressure, explosion, pump cavitation, etc. while the crude oil is stored or/and or transported. The vapor pressure of crude oil is commonly measured in PSIA as Reid Vapor Pressure (RVP). Several companies and governmental bodies within the United States of America are setting limits on acceptable levels of RVP within pipelines and rail cars. This is due to several rail car accidents and disasters involving volatile crude oil resulting in loss of life and property.

Transport of high RVP crude oil from colder to warmer climates exacerbates the problem, as the crude oil becomes increasingly volatile as temperature increases. High RVP crude oil within pipeline operations can cause pump cavitation, vapor lock, and lower pump efficiencies, impacting operations, as well as increase fugitive emissions at storage facilities. Stringent limits have also been placed on fugitive emissions from oil exploration and production activities by the United Stated Environmental Protection Agency (EPA) set forth in 40 CFR Part 60 Subpart OOOO (Quad-O) penalizing operators for leaks and storage tank off-gassing. Even when hydrocarbon vapors are flared, the public perception of "pollution" can be negative. A common practice to decrease the RVP or volatility of the crude oil to comply with rules and regulations has been to use a heated treater or heated separator. These devices are not an efficient method to stabilize the crude oil and are often required to operate above the temperature design parameters resulting in fire tube coking and failure. Volatile crude oil stored in atmospheric storage tanks causes off-gassing within the storage vessels increasing the likelihood fugitive emissions, fire, and/or explosions.

SUMMARY OF EXAMPLE EMBODIMENTS

An example embodiment may include an apparatus for separating production fluids comprising a three phase separator for separating a production fluid into a first oil output, a first gas output, and a first water output, a first flow control valve receiving the first gas output and generating a gas slipstream, a heater coupled to the first oil output, wherein the heater heats the first oil output to produce a heated second oil output, and a gas stripping column receiving the heated second oil output at the top and the gas slipstream at the bottom, wherein the heated oil is stripped of light hydrocarbons and any remaining water by the interaction of the slipstream flowing upwards through the heated second oil output falling downward to produce a third oil output and a second gas output.

A variation of the example embodiment may include a coalescer receiving the water output, which generates a third gas output, a second water output, and a coalescer oil output that combines with the first oil output. It may include a flash tank receiving the dead third oil output, wherein the dead oil is let down to a lower pressure, resulting in residual light hydrocarbons to flash off and producing a fourth oil output. It may include the heated third oil output being sent to a flash pot before it is sent to the oil stripper column, resulting a flash off of light hydrocarbons to form a fourth gas output. It may include the first gas output being combined with the second gas output and the third gas output to form the final gas product for a commercial metered gas pipeline. It may include the third oil output being sent to a commercial metered oil pipeline. It may include the second water output being sent to a water treatment facility. It may include a first pressure control valve coupled between the first gas output and the second gas output, wherein the first pressure control valve regulates the pressure within the gas stripping column. It may include a low pressure combustor for burning off the flash off of light hydrocarbons produced by the flash tank. It may include a flash tank for receiving the third oil output, wherein the flash tank generates a fourth oil output and a third gas output. It may include a flash pot for receiving the heated second oil output, wherein the flash pot separates gas from the heated second oil output before it enters the gas stripping column. It may include a control valve on the gas stripper column for regulating the pressure within the gas stripper column.

An example embodiment may include a method for separating production fluids comprising sending production fluids into a fluid separator to generate a first gas output, a first oil output, and a first water output, heating the first oil output in an oil heater to generate a heated second oil output, generating a gas slipstream from the first gas output, and stripping the light hydrocarbons by combining the gas slipstream with the heated second oil output in a gas stripping column to generate a dead third oil output and a second gas output.

A variation of the example embodiment may include sending the first water output to a coalescer to generate a third gas output, a second water output, and a coalescer oil output. It may include flashing off light hydrocarbons from the third oil output to generate a fourth oil output and a flash off gas. It may include combusting the light hydrocarbon flash off. The slipstream may be generated using a flow control valve on the first gas output. The third oil output may be suitable for sale in an oil pipeline. It may include flashing off light hydrocarbons of the first oil output before heating it. The oil heater may raise the first oil temperature to 170° F. It may include maintaining a constant oil level in the gas stripping column. It may include combining the coalescer oil into the first oil output. It may include sending the third oil output into a flash tank to generate a fourth oil output and a third gas output. It may include pumping the heated second oil output into flash pot, wherein gas is separated off of the heated second oil output before it enters the gas stripping column. It may include regulating the pressure on the gas stripper column at or below sales gas pressure.

An example embodiment may include a method for separating production fluids comprising sending production fluids into a first fluid separator, wherein the first fluid separator generates a first gas output, a first treated oil output, and a first untreated oil output, sending the first untreated oil output into a second oil separator, wherein the second fluid separator generates a second gas output, a second treated oil output, and a second untreated oil output, sending the second untreated oil output into a third oil separator, wherein the third fluid separator generates a third gas output, a third treated oil output, and a third untreated oil output, sending the third untreated oil output into a fourth oil separator, wherein the fourth fluid separator generates a fourth gas output, a fourth treated oil output, and a fourth untreated oil output, and sending the fourth untreated oil output into a fifth oil separator, wherein the fifth fluid separator generates a fifth gas output, a fifth treated oil output, and a water output.

A variation of the example embodiment may include sending the fifth gas output into the fourth fluid separator via a liquid-gas jet compressor. It may include sending the fourth gas output into the third fluid separator via a liquid-gas jet compressor. It may include sending the third gas output into the second fluid separator via a liquid-gas jet compressor. It may include sending the second gas output into the first fluid separator via a liquid-gas jet compressor. It may include sending the first gas output to the sales gas line. It may include sending the first treated gas output and gas from production into a liquid gas mixer to generate an output mixture. It may include reintroducing the output mixture into the first fluid separator. It may include sending the first treated oil output through a line heater.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
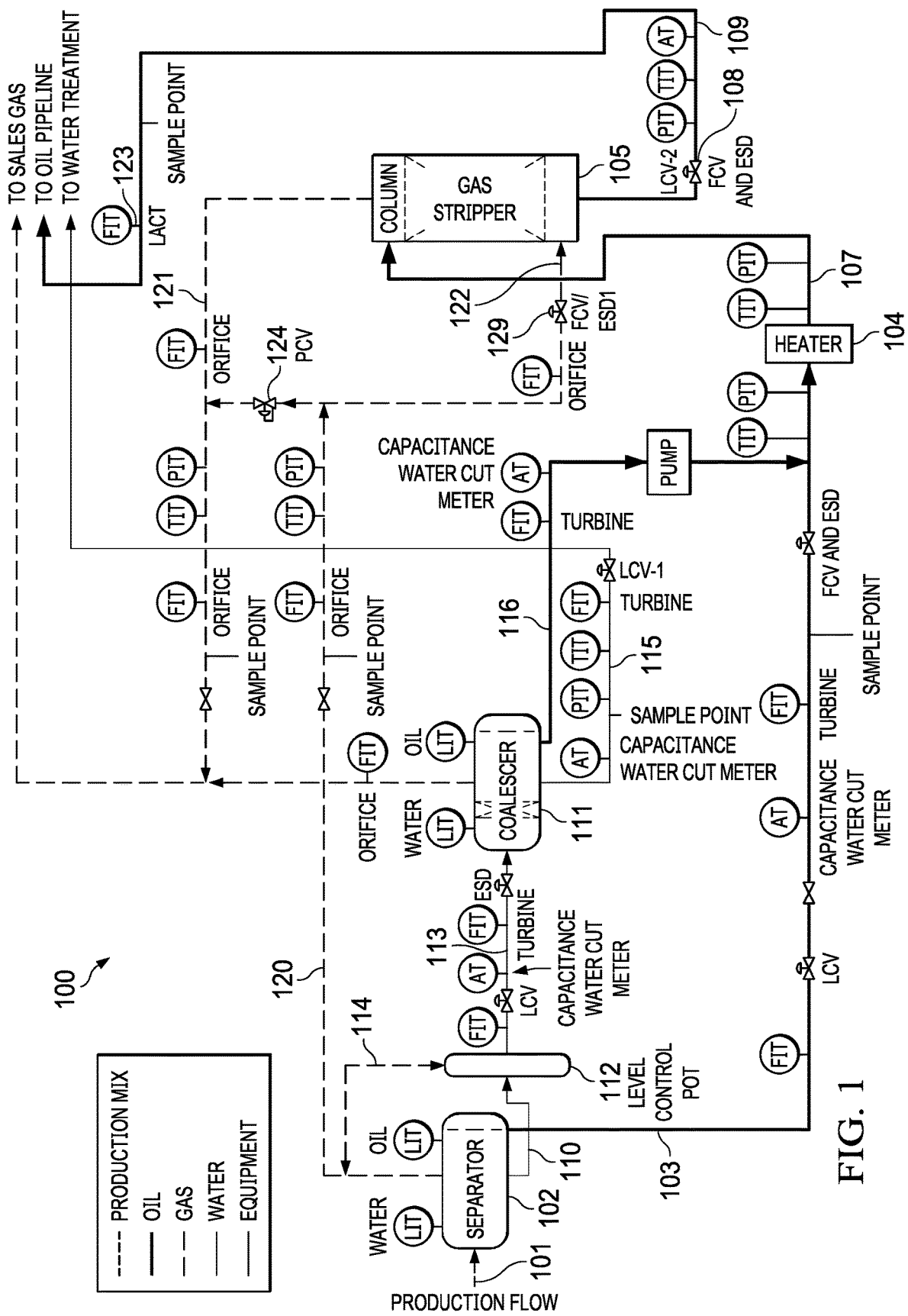
FIG. 1 depicts an example embodiment of a flow diagram of a high pressure oil treatment process.

An example embodiment is disclosed in FIG. 1 as a high pressure oil treatment process 100. Production flow 101 enters a three phase separator 102. The separator 102 separates the production flow 101 into an oil output 103, a water output 110, and a gas output 120. The three outputs still have recoverable hydrocarbons that can be further separated and extracted. The oil output 103 contains emulsified water and dissolved light hydrocarbons. The water output 110 still contains recoverable amounts of oil and gas.

The oil output 103 enters a heater 104 to raise its temperature to approximately 170° F. The heated oil output 107 is fed to the top of a gas stripping tower 105. The oil cascades through the tower internals, for example packing or trays, within the gas stripping tower 105 and collects at the bottom. The gas stripping tower 105 is a tower with more than one theoretical stage operating near the CTB sales gas pressure. The gas stripping tower 105 may be packed, although other methods known in the art may be utilized. The oil level is maintained within the gas stripping tower 105 by level control valve 108. The oil output 109 from the gas stripping tower 105 may be delivered to an oil pipeline. The oil output 109 is considered dead with the light hydrocarbons and water removed. The Reid vapor pressure of the oil output 109 is lowered below 9 psia. The oil output 109 meets the transfer pipeline requirements for salable oil. The oil may be pumped through a lease automatic custody transfer unit 123 quality meter. The oil may be pumped to a heated treater. The oil may be pumped to pipeline pressure and sent through a custody transfer meter to be sold.

The gas output 120 from the separator 102 passes through pressure control valve 124. Pressure control valve 124 maintains the gas stripping tower 105 to operate at sales gas pressure. A slipstream gas 122 is generated off the output gas 120, via flow control valve 129, and is fed into the bottom of the gas stripper tower 105. The slip stream gas 122 is between 15-75% of the output gas 120. The slipstream gas 122 passes through the tower internals and exits out of the top of the gas stripping tower 105. The slipstream gas 122 mixes counter currently through tower internals with the hot oil output 107. The mass and thermal transfer between the slipstream gas 122 and the heated oil output 107 in the gas stripping column 105 removes or strips the light hydrocarbons and water from the heated oil output 107 entering the gas stripping tower 105 from the top. Minimal gas flow through the gas stripping tower 105 is sufficient for the stripping operation. Gas output 121 from the gas stripping tower 105 is recombined with the main gas output 120 and passes through an allocation meter prior to being sent to a sales gas pipeline or a pipeline to lift gas compression.

The water output 110 from the separator 102 enters a level control pot 112. Level control pot 112 outputs water 113 that is fed into coalescer 111. The gas output 120 may provide level control via 114. Coalescer 111 in this example is a horizontal coalescer, it is a three-phase separator operating at sales gas pressure. Packing is installed in the coalescer 111 that causes the small droplets of oil in the water 113 to collide and merge into larger droplets that more easily separate from the water into two distinct phases. That water output 115 is at sales gas pressure and can enter a pipeline to saltwater disposal without the need for pumping in most cases. Oil skimmed 116 from the coalescer 111 is at sales gas 121 pressure, so it can pass through a level control valve and also be fed to the heaters 104 with the main oil output 103.

Figure 2:
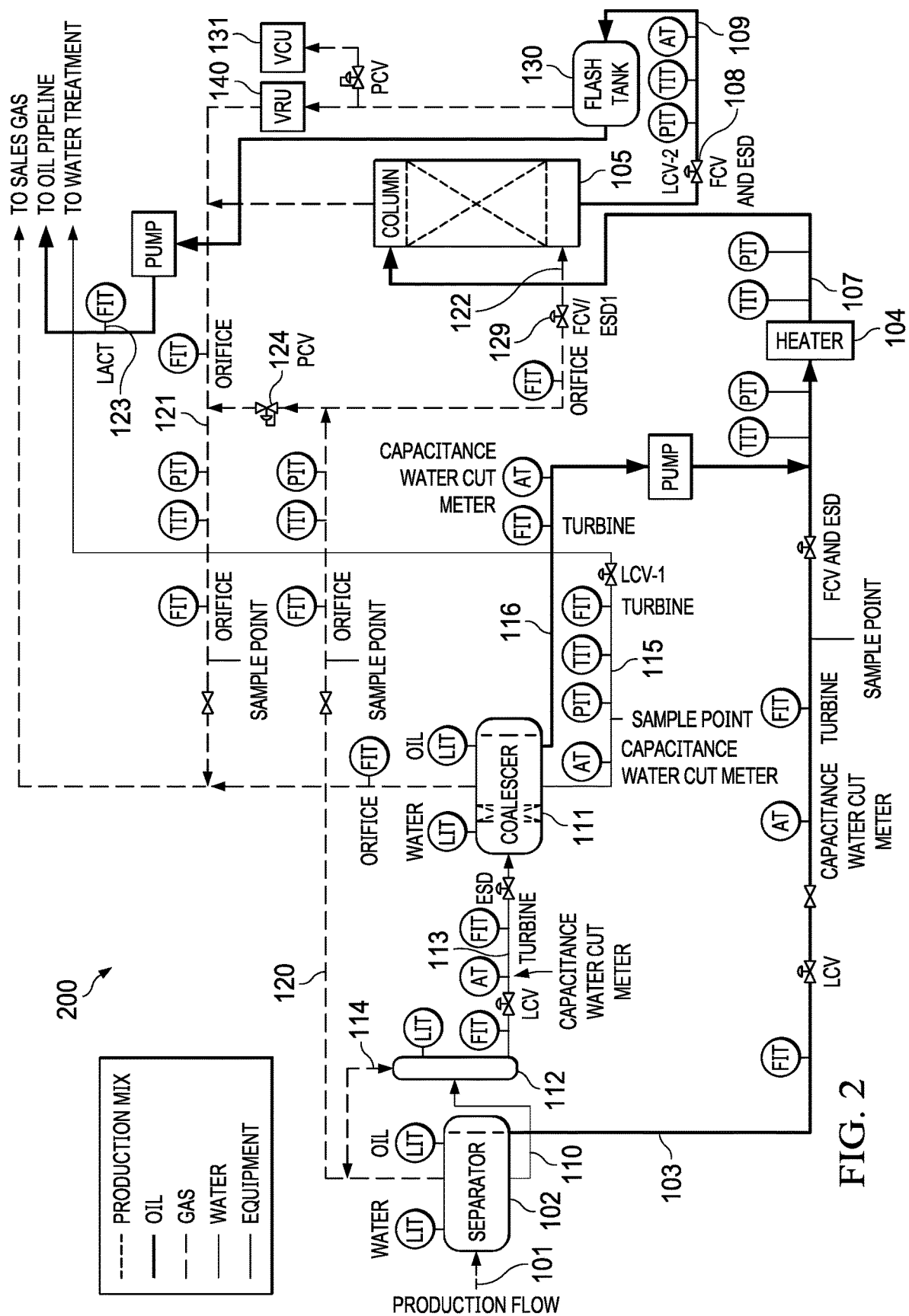
FIG. 2 depicts an example embodiment of a flow diagram of a high pressure oil treatment process with a flash tank.

An example embodiment is disclosed in FIG. 2 as a high pressure oil treatment process 200. Production flow 101 enters a three phase separator 102. The separator 102 separates the production flow 101 into an oil output 103, a water output 110, and a gas output 120. The three outputs still have recoverable hydrocarbons that can be further separated and extracted. The oil output 103 contains emulsified water and dissolved light hydrocarbons. The water output 110 still contains recoverable amounts of oil and gas.

The oil output 103 enters a heater 104 to raise its temperature to approximately 170° F. The heated oil output 107 is fed to the top of a gas stripping tower 105. The oil cascades through the internals within the gas stripping tower 105 and collects at the bottom. The gas stripping tower 105 is a tower with more than one theoretical stage operating near the CTB sales gas pressure. The oil level is maintained within the gas stripping tower 105 by level control valve 108. The oil output 109 from the gas stripping tower 105 may be delivered to an oil pipeline. The oil output 109 is considered dead with the light hydrocarbons and water removed. The Reid vapor pressure of the oil output 109 is lowered below 9 psia. The oil output 109 meets the transfer pipeline requirements for salable oil. The oil output 109 may be let down to a holding vessel 130 at around 5 psig to allow any residual light hydrocarbons to flash off. The low-pressure flashing in vessel 130 reduces the residual oil shrinkage that can occur during pressure letdown in the pipeline and is either burned as fuel gas or recovered with a small vapor recovery unit. Excess low pressure gas from the vessel 130 can be used as a fuel source or burned off via a low pressure combustor 131 if a vapor recovery unit 140 is not available. The oil may be pumped through a lease automatic custody transfer unit 123 quality meter. The oil may be pumped to a heated treater. The oil may be stored in pressurized or atmospheric storage tanks. The oil may be pumped to pipeline pressure and sent through a custody transfer meter to be sold.

The gas output 120 from the separator 102 passes through pressure control valve 124. Pressure control valve 124 maintains the gas stripping tower 105 to operate at sales gas pressure. A slip stream gas 122 off the output gas 120, via flow control valve 129, is fed into the bottom of the gas stripper tower 105. The slip stream gas 122 is between 15-75% of the output gas 120. The slip stream gas 122 passes through the tower internals and exits out of the top of the gas stripping tower 105. The slip stream gas 122 removes or strips the light hydrocarbons and water from the heated oil output 107 entering the gas stripping tower 105 from the top. Minimal gas flow through the gas stripping tower 105 is sufficient for the stripping operation. Gas output 121 from the gas stripping tower 105 is recombined with the main gas output 120 and passes through an allocation meter prior to being sent to a sales gas pipeline or a pipeline to lift gas compression.

The water output 110 from the separator 102 enters a level control pot 112. Level control pot 112 outputs water 113 that is fed into coalescer 111. The gas output 120 may provide level control via 114. Coalescer 111 in this example is a horizontal coalescer, it is a three-phase separator operating at sales gas pressure. Packing is installed in the coalescer 111 that causes the small droplets of oil in the water 113 to collide and merge into larger droplets that more easily separate from the water into two distinct phases. That water output 115 is at sales gas pressure and can enter a pipeline to saltwater disposal without the need for pumping in most cases. Oil skimmed 116 from the coalescer 111 is at sales gas 121 pressure, so it can pass through a level control valve and also be fed to the heaters with the main oil output 103.

Figure 3:
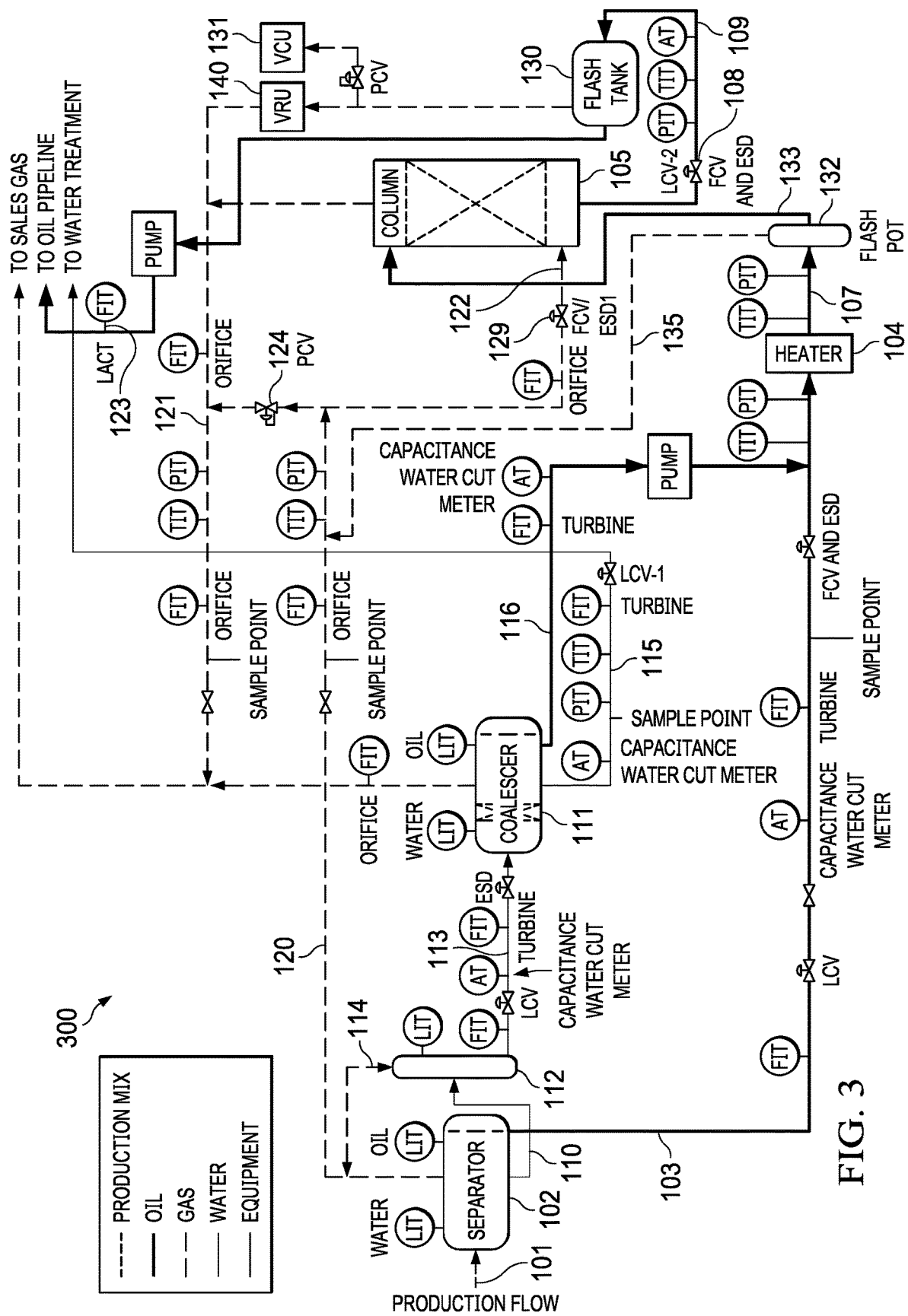
FIG. 3 depicts an example embodiment of a flow diagram of a high pressure oil treatment process with a flash tank and a flash pot.

An example embodiment is disclosed in FIG. 3 as a high pressure oil treatment process 300. Production flow 101 enters a three phase separator 102. The separator 102 separates the production flow 101 into an oil output 103, a water output 110, and a gas output 120. The three outputs still have recoverable hydrocarbons that can be further separated and extracted. The oil output 103 contains emulsified water and dissolved light hydrocarbons. The water output 110 still contains recoverable amounts of oil and gas.

The oil output 103 enters a heater 104 to raise its temperature to approximately 170° F. The heated oil output 107 is fed to a flash pot 132, where volatile gases are allowed to flash off and are collected into gas output 135 which is combined with the main gas output 120.

The oil output 133 from the flash pot is fed into the top of a gas stripping tower 105. The oil cascades through the internals within the gas stripping tower 105 and collects at the bottom. The gas stripping tower 105 is a tower with more than one theoretical stage operating near the CTB sales gas pressure. The oil level is maintained within the gas stripping tower 105 by level control valve 108. The oil output 109 from the gas stripping tower 105 may be delivered to an oil pipeline. The oil output 109 is considered dead with the light hydrocarbons and water removed. The Reid vapor pressure of the oil output 109 is lowered below 9 psia. The oil output 109 meets the transfer pipeline requirements for salable oil. The oil output 109 may be let down to a holding vessel 130 at around 5 psig to allow any residual light hydrocarbons to flash off. The low-pressure flashing in vessel 130 reduces the residual oil shrinkage that can occur during pressure letdown in the pipeline and is either burned as fuel gas or recovered with a small vapor recovery unit 140. Excess low pressure gas from the vessel 130 can be used as a fuel source or burned off via a low pressure combustor 131 if a vapor recovery unit 140 is not available. The oil may be pumped through a lease automatic custody transfer unit 123 quality meter. The oil may be pumped to a heated treater. The oil may be pumped to pipeline pressure and sent through a custody transfer meter to be sold.

The gas output 120 from the separator 102 passes through pressure control valve 124. Pressure control valve 124 maintains the gas stripping tower 105 to operate at sales gas pressure. A slip stream gas 122 off the output gas 120, via flow control valve 129, is fed into the bottom of the gas stripper tower 105. The slip stream gas 122 is between 15-75% of the output gas 120. The slip stream gas 122 passes through the tower internals and exits out of the top of the gas stripping tower 105. The slip stream gas 122 removes or strips the light hydrocarbons and water from the heated oil output 133 entering the gas stripping tower 105 from the top. Minimal gas flow through the gas stripping tower 105 is sufficient for the stripping operation. Gas output 121 from the gas stripping tower 105 is recombined with the main gas output 120 and passes through an allocation meter prior to being sent to a sales gas pipeline or a pipeline to lift gas compression.

The water output 110 from the separator 102 enters a level control pot 112. Level control pot 112 outputs water 113 that is fed into coalesce 111. The gas output 120 may provide level control via 114. Coalescer 111 in this example is a horizontal coalescer, it is a three-phase separator operating at sales gas pressure. Packing is installed in the coalescer 111 that causes the small droplets of oil in the water 113 to collide and merge into larger droplets that more easily separate from the water into two distinct phases. That water output 115 is at sales gas 121 pressure and can enter a pipeline to saltwater disposal without the need for pumping in most cases. Oil skimmed 116 from the coalescer 111 is at sales gas 121 pressure, so it can pass through a level control valve and also be fed to the heaters with the main oil output 103.

Figure 4:
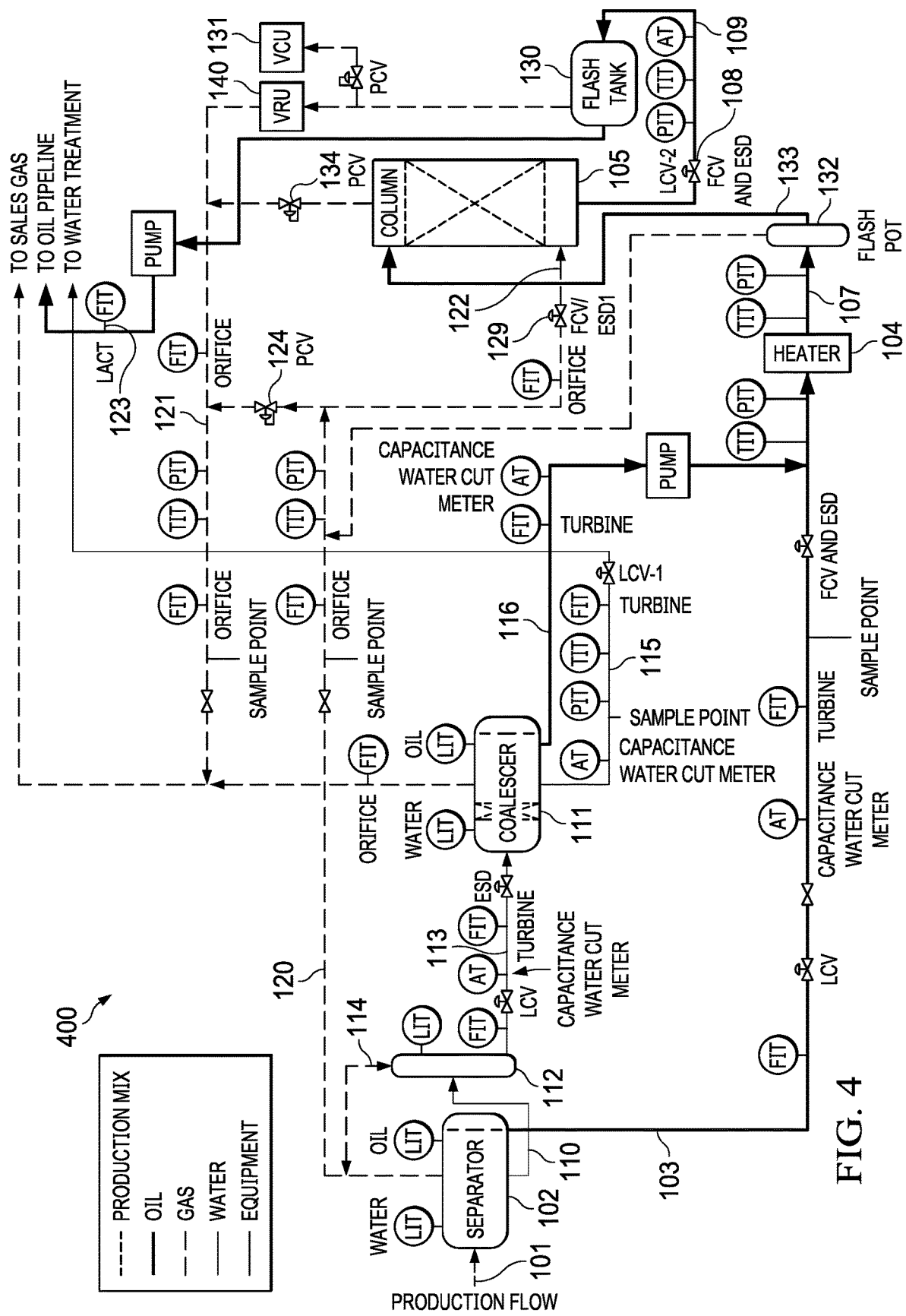
FIG. 4 depicts an example embodiment of a flow diagram of a high pressure oil treatment process with a flash tank and a flash pot with a pressure control valve for regulating the gas stripping tower pressure.

An example embodiment is disclosed in FIG. 4 as a high pressure oil treatment process 400. Production flow 101 enters a three phase separator 102. The separator 102 separates the production flow 101 into an oil output 103, a water output 110, and a gas output 120. The three outputs still have recoverable that can be further separated and extracted. The oil output 103 contains emulsified water and dissolved light hydrocarbons. The water output 110 still contains recoverable amounts of oil and gas.

The oil output 103 enters a heater 104 to raise its temperature to approximately 170° F. The heated oil output 107 is fed to the flash pot 132 where volatile gases are allowed to flash off and are collected into gas output 133 which is fed into the top of a gas stripping tower 105. The oil cascades through the tower internals within the gas stripping tower 105 and collects at the bottom. The gas stripping tower 105 is a tower with more than one theoretical stage operating near the CTB sales gas pressure. The oil level is maintained within the gas stripping tower 105 by level control valve 108. The oil output 109 from the gas stripping tower 105 may be delivered to an oil pipeline. The oil output 109 is considered dead with the light hydrocarbons and water removed. The Reid vapor pressure of the oil output 109 is lowered below 9 psia. The oil output 109 meets the transfer pipeline requirements for salable oil. The oil output 109 may be let down to a holding vessel at around 5 psig to allow any residual light hydrocarbons to flash off. The low-pressure flash in a holding vessel reduces the residual oil shrinkage that can occur during pressure letdown in the pipeline and is either burned as fuel gas or recovered with a small vapor recovery unit 140. Excess low pressure gas from the vessel 130 can be used as a fuel source or burned off via a low pressure combustor, vapor combustion unit 131, if a vapor recovery unit 140 is not available. The oil may be pumped through a lease automatic custody transfer unit 123 quality meter. The oil may be pumped to a heated treater. The oil may be pumped to pipeline pressure and sent through a custody transfer meter to be sold.

The gas output 120 from the separator 102 passes through pressure control valve 124 and through pressure control valve 129. Pressure control valve 134 maintains the gas stripping tower 105 to operate at or below sales gas pressure. A slipstream gas 122 is generated off the output gas 120, via flow control valve 129, and is fed into the bottom of the gas stripper tower 105. The slip stream gas 122 is between 15-75% of the output gas 120. The slipstream gas 122 passes through the tower internals and exits out of the top of the gas stripping tower 105. The slipstream gas 122 mixes counter currently over tower internals with the hot oil output 107. The mass and thermal transfer between the slipstream gas 122 and the heated oil output 107 in the gas stripping column 105 removes or strips the light hydrocarbons and water from the heated oil output 107 entering the gas stripping tower 105 from the top. Minimal gas flow through the gas stripping tower 105 is sufficient for the stripping operation. Gas output 121 from the gas stripping tower 105 is recombined with the main gas output 120 and passes through an allocation meter prior to being sent to a sales gas pipeline or a pipeline to lift gas compression.

The water output 110 from the separator 102 enters a level control pot 112. Level control pot 112 outputs water 113 that is fed into coalescer 111. The gas output 120 may provide level control via 114. Coalescer 111 in this example is a horizontal coalescer, it is a three-phase separator operating at sales gas pressure. Packing is installed in the coalescer 111 that causes the small droplets of oil in the water 113 to collide and merge into larger droplets that more easily separate from the water into two distinct phases. That water output 115 is at sales gas pressure and can enter a pipeline to saltwater disposal without the need for pumping in most cases. Oil skimmed 116 from the coalescer 111 is at sales gas 121 pressure, so it can pass through a level control valve and also be fed to the heaters with the main oil output 103.

Figure 5A:
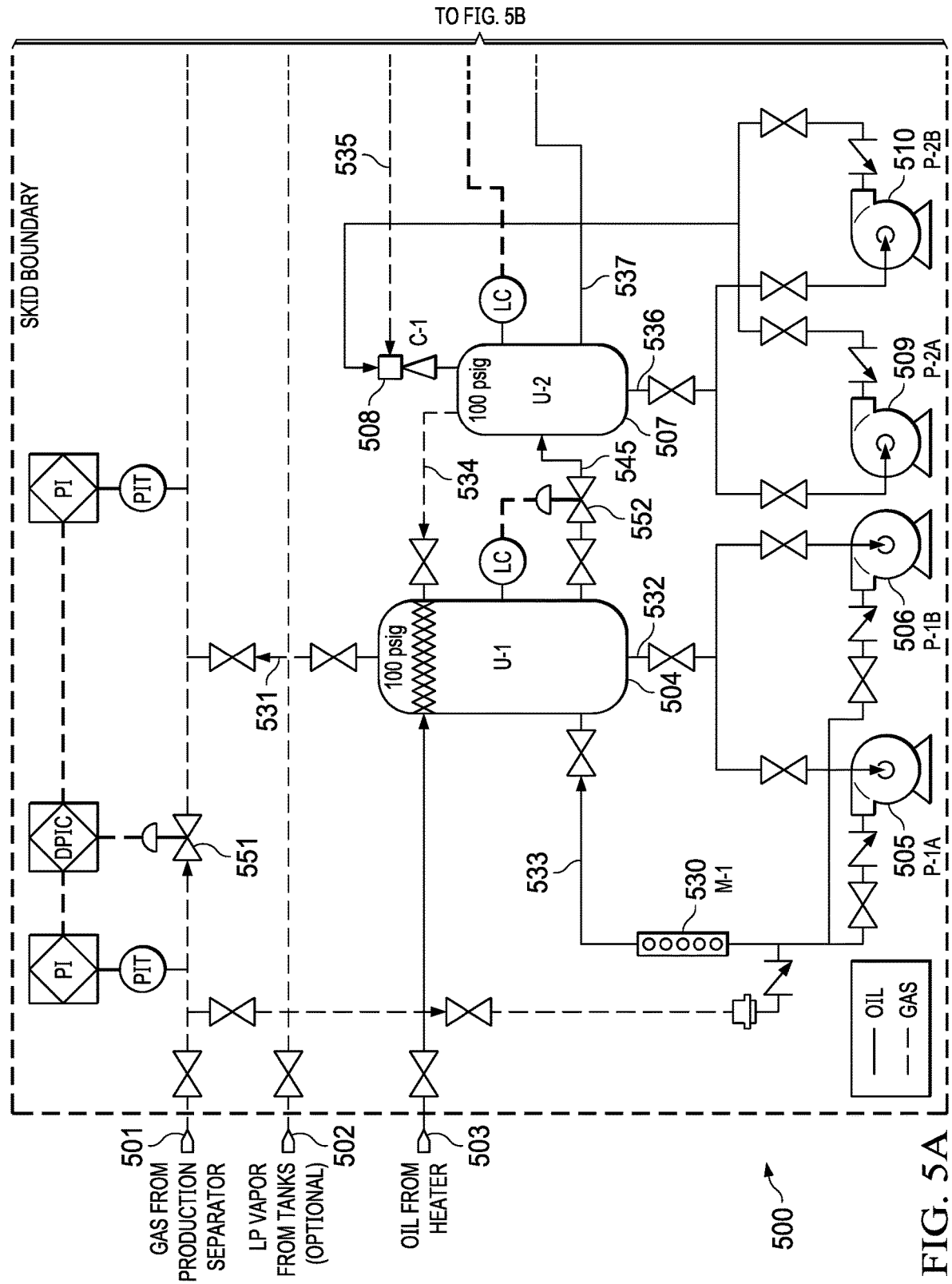
FIG. 5A depicts an example embodiment of a flow diagram of a high pressure oil treatment process utilizing a plurality of stabilizer vessels.
Figure 5B:
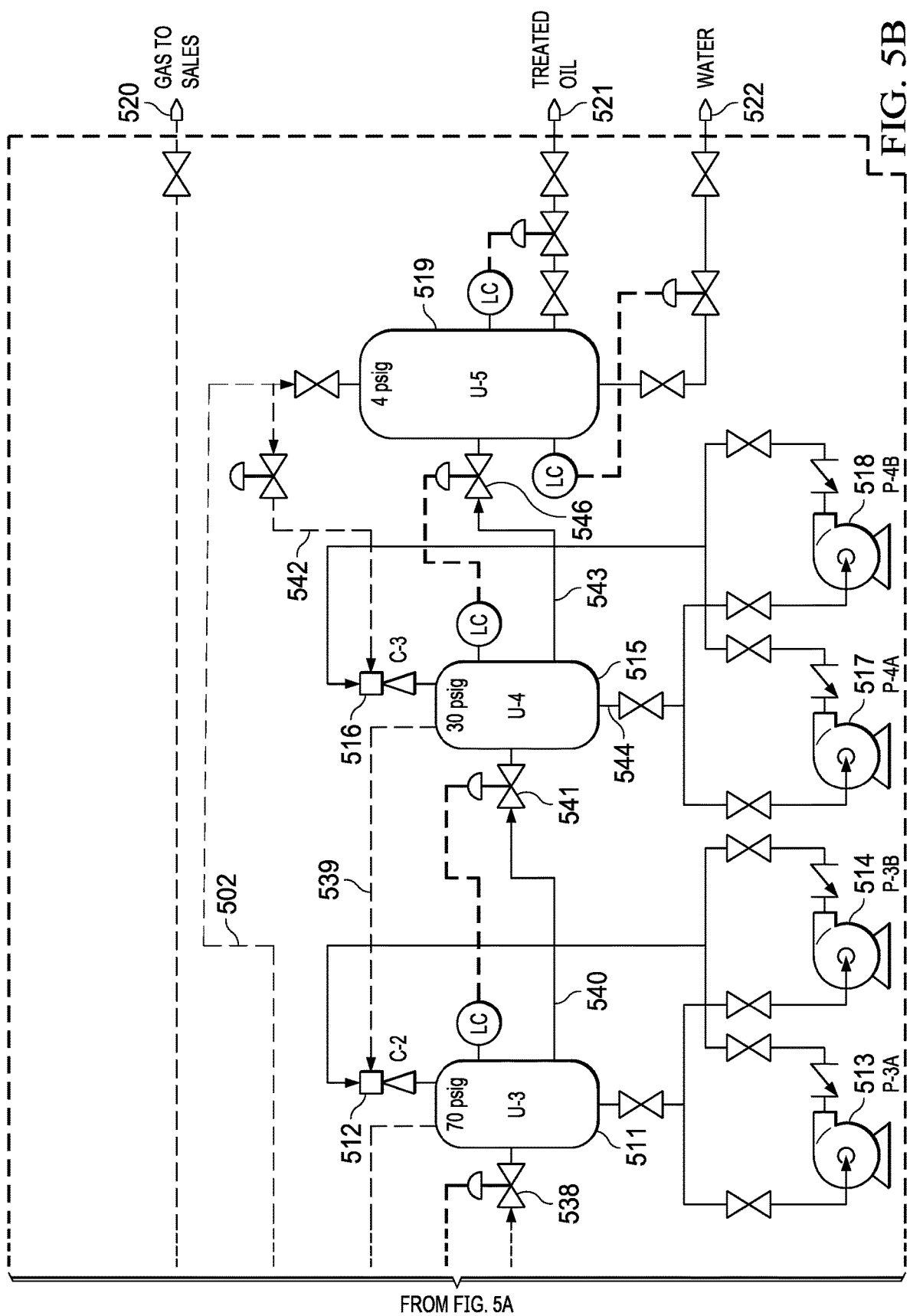
FIG. 5B depicts an example embodiment of a flow diagram of a high pressure oil treatment process utilizing a plurality of stabilizer vessels.

An example embodiment is disclosed in FIGS. 5A and 5B of an oil separating process 500. The oil separating process 500 may include three inputs, gas from a production separator 501, an optional vapor from tanks 502, and oil from a heater 503. The outputs include sales gas 520, treated oil 521, and water 522. The heated oil 503 enters the first stage stabilizer vessel 504. There it produces output gas 531 at sales gas pressure. The liquid production 532 circulates via stripping pumps 505 and 506 through liquid gas mixer 530 that mixes the liquid production with virgin gas, liberating light hydrocarbons from solution through thermodynamic and mass transfer. The virgin gas slipstream to the liquid gas mixer 530 is controlled by pressure control valve 551 and a pressure control loop. The output 533 of the liquid gas mixer 530 is then reintroduced into the first stage stabilizer vessel 504.

Still referring to FIGS. 5A and 5B, the second stage stabilizer vessel 507 is designed to stabilize oil for sale at sales gas pressure. Liquid hydrocarbons 545 from the first stabilizer vessel 504 are sent to the second stabilizer vessel 507 via level control valve 552 sized for the design flowrate. Evolved gas 534 to the first stage stabilizer vessel 504. Booster pumps 509 and 510 circulate the liquid 536 from second stage stabilizer vessel 507 into a liquid-gas jet compressor, which compresses gas 535 evolved from a third stage stabilizer vessel 511 up to sales gas pressure. The liquid in second stage stabilizer vessel 507 is controlled via a level control loop. The liquids 537 are let down to the third stage stabilizer vessel 511 via a level control valve 538 sized for the design flowrate. Gas evolved 535 in the third stabilizer vessel 511 is compressed to the second stage stabilizer vessel 507 via liquid-gas jet compressor 508.

Still referring to FIGS. 5A and 5B, the third stage stabilizer vessel 511 is designed to stabilize the oil for sale at or below sales gas pressure. The vessel also acts as a gas displacer sending evolved gas 535 to the second stage stabilizer vessel 507. Booster pumps 513 and 514 circulate the liquid from the third stage stabilizer vessel 511 through a liquid-gas jet compressor 512, which compresses the gas 539 evolved from a fourth stage stabilizer vessel 515. The liquid level in the third stage stabilizer vessel 511 is controlled via a level control loop. Liquids 540 are let down to the fourth stage stabilizer vessel 515 via a level control valve 541.

Still referring to FIGS. 5A and 5B, the fourth stage stabilizer vessel 515 is designed to stabilize the oil for sale at or below sales gas pressure. The vessel also acts as a gas displacer sending evolved gas 539 to the third stage stabilizer vessel 511. Booster pumps 517 and 518 circulate the liquid 544 from the fourth stage stabilizer vessel 515 through a liquid-gas jet compressor 516, which compresses the gas 542 evolved from a fifth stage stabilizer vessel 519. The liquid level in the fourth stage stabilizer vessel 515 is controlled via a level control loop. Liquids 543 are let down to the fifth stage stabilizer vessel 519 via a level control valve 546.

Still referring to FIGS. 5A and 5B, the fifth stage stabilizer vessel 519 is designed to stabilize the oil for sales at or below sales gas pressure. Gas evolved 542 in fifth stage stabilizer vessel 519 is compressed to fourth stage stabilizer vessel 515 via liquid-gas jet compressor 516. The final fifth stage stabilizer vessel 519 could also polish any water carryover 522 from the production separator. The liquid level in the fifth stage stabilizer vessel 519 is controlled via a level control loop using a level control valve associated with the liquids sent to a downstream LACT (lease automatic custody transfer) or storage tanks. The operating pressure of fifth stage stabilizer vessel 519 is control by a backpressure control valve and the suction pressure imposed by liquid-gas jet compressor 516. If desired a negative pressure can be obtained in fifth stage stabilizer vessel 519 by setting a backpressure control point, further reducing the heat requirements and/or RVP. Optionally, off gas vapors from storage tanks 502 may also be added to the evolved gas 542 to be compressed. Liquid-gas jet compressor 516 can pull a vacuum on fifth stage stabilizer vessel 519.

Figure 6A:
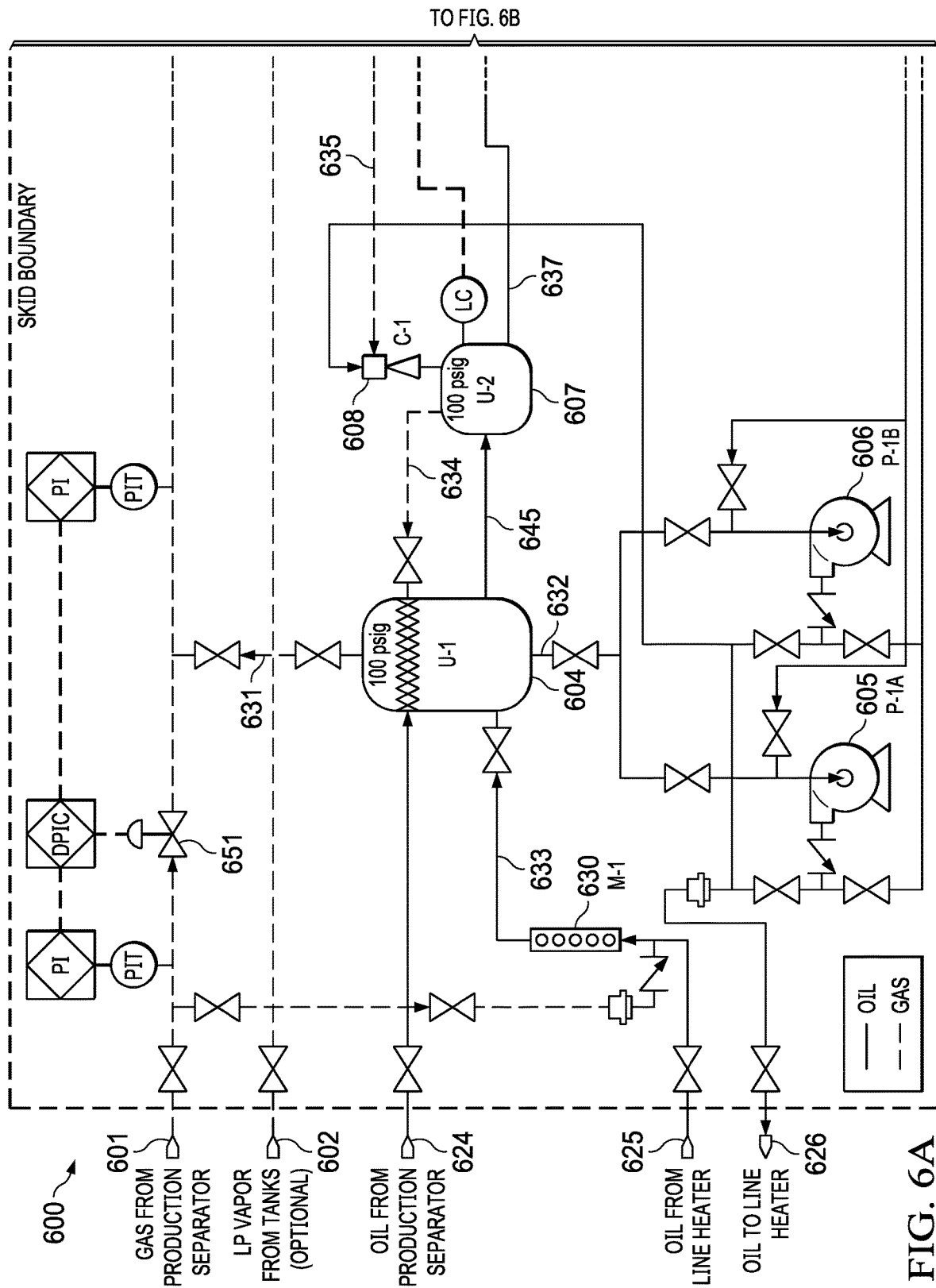
FIG. 6A depicts an example embodiment of a flow diagram of a high pressure oil treatment process utilizing a plurality of stabilizer vessels with fewer pumps and utilizing an oil line heater.
Figure 6B:
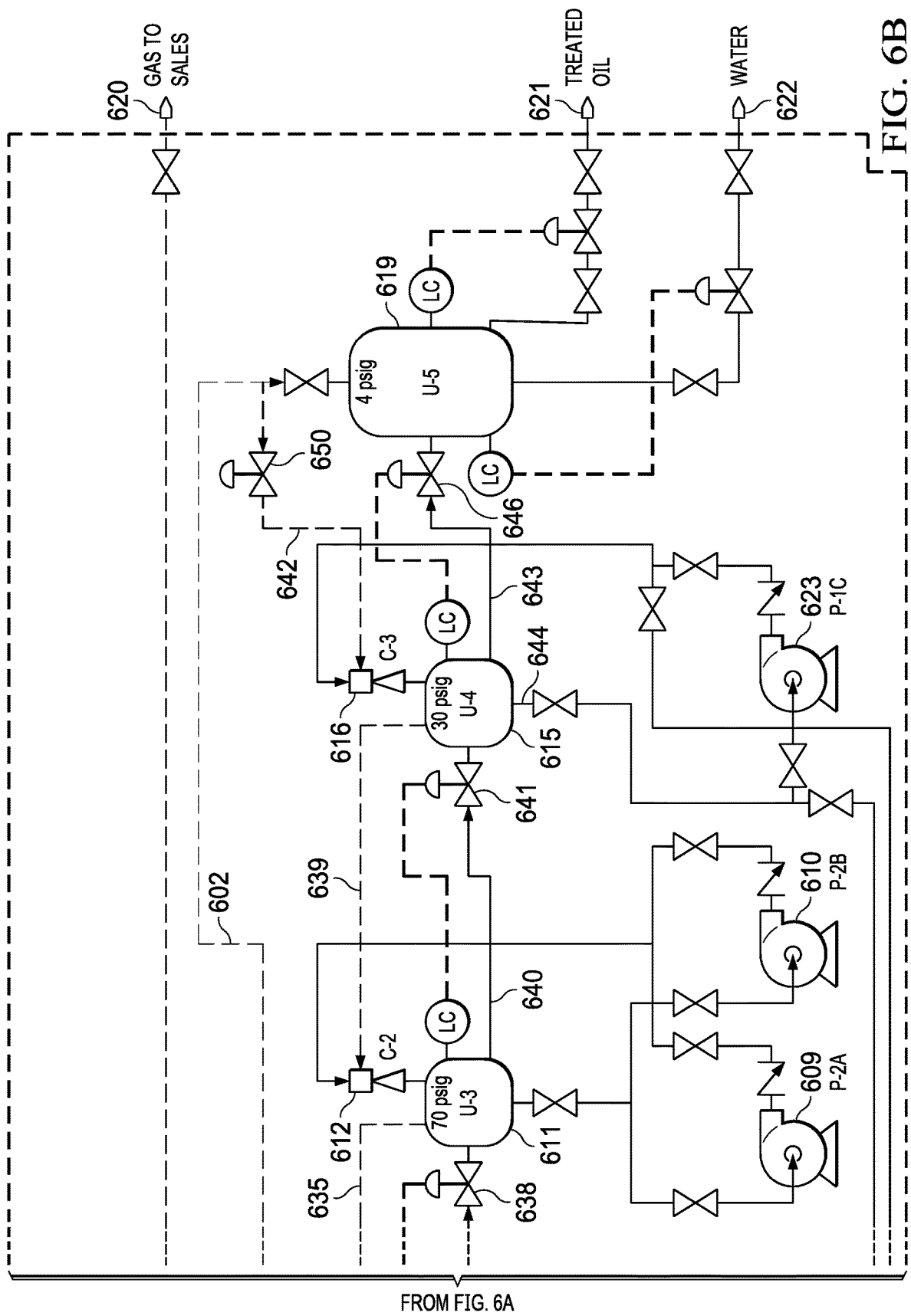
FIG. 6B depicts an example embodiment of a flow diagram of a high pressure oil treatment process utilizing a plurality of stabilizer vessels with fewer pumps and utilizing an oil line heater.

An example embodiment is disclosed in FIGS. 6A and 6B of an oil separating process 600. The oil separating process 600 may include inputs of gas from a production separator 601, vapor from tanks 602, oil from production separator 624, and oil from line heater 625. The outputs include sales gas to sales 620, treated oil 621, and water 622. The production separator liquid hydrocarbon 624 enters the first stage stabilizer vessel 604. There it produces output gas 631 at sales gas pressure. The liquid production 632 circulates via stripping pumps 605 and 606 to an oil to line heater 626. Oil from the oil line heater 625 is then pumped through liquid gas mixer 630 that mixes the heated oil with virgin gas, liberating light hydrocarbons from solution through thermodynamic and mass transfer. The virgin gas slipstream to the liquid gas mixer 630 is controlled by pressure control valve 651 and a pressure control loop. The output 633 of the liquid gas mixer 630 is then reintroduced into the first stage stabilizer vessel 604. The liquids 645 are let down to the second stage stabilizer vessel 607.

Still referring to FIGS. 6A and 6B, the second stage stabilizer vessel 607 is designed to stabilize oil for sale at sales gas pressure. It acts as a displacer sending evolved gas 634 to the first stage stabilizer vessel 604. Booster pumps 605 and 606 circulate the liquid 632 from the first stage stabilizer vessel 604 into a liquid-gas jet compressor 608, which compresses gas 635 evolved from a third stage stabilizer vessel 611 up to sales gas pressure. The liquid in second stage stabilizer vessel 607 is controlled via a level control loop. The liquids 637 are let down to the third stage stabilizer vessel 611 via a level control valve 638 sized for the design flowrate. Liquid Level and pressure are the same between the first stage stabilizer vessel 604 and the second stabilizer vessel 604 via liquid connection 645.

Still referring to FIGS. 6A and 6B, the third stage stabilizer vessel 611 is designed to stabilize the oil for sale at or below sales gas pressure. The vessel also acts as a gas displacer sending evolved gas 635 to the second stage stabilizer vessel 607. Booster pumps 609 and 610 circulate the liquid from the third stage stabilizer vessel 611 through a liquid-gas jet compressor 612, which compresses the gas 639 evolved from a fourth stage stabilizer vessel 615. The liquid level in the third stage stabilizer vessel 611 is controlled via a level control loop. Liquids 640 are let down to the fourth stage stabilizer vessel 615 via a level control valve 641.

Still referring to FIGS. 6A and 6B, the fourth stage stabilizer vessel 615 is designed to stabilize the oil for sale at or below sales gas pressure. The vessel also acts as a gas displacer sending evolved gas 639 to the third stage stabilizer vessel 611. Booster pumps 623 and 605 circulate liquids 644 from the fourth stage stabilizer vessel 615 through a liquid-gas jet compressor 616, which compresses the gas 642 evolved from a fifth stage stabilizer vessel 619. The liquid level in the fourth stage stabilizer vessel 615 is controlled via a level control loop. Liquids 643 are let down to the fifth stage stabilizer vessel 619 via a level control valve 646.

Still referring to FIGS. 6A and 6B, the fifth stage stabilizer vessel 619 is designed to stabilize the oil for sales at or below sales gas pressure. Gas 642 evolved in fifth stage stabilizer vessel 619 is compressed to fourth stage stabilizer vessel 615 via liquid-gas jet compressor 616. The final fifth stage stabilizer vessel 619 could also polish any water carryover from the production separator. The liquid level in the fifth stage stabilizer vessel 619 is controlled via a level control loop using a level control valve associated with the liquids sent to a downstream LACT or storage tanks. The operating pressure of fifth stage stabilizer vessel 619 is control by a backpressure control valve 650 and the suction pressure imposed by liquid-gas jet compressor 616. If desired a negative pressure can be obtained in fifth stage stabilizer vessel 619 by setting a backpressure control point, further reducing the heat requirements and/or RVP. Optionally, off gas vapors from storage tanks 602 may also be added to the evolved gas 642 to be compressed. Liquid-gas jet compressor 616 can pull a vacuum on fifth stage stabilizer vessel 619.

Mass transfer is enhanced by an increase in temperature for mixer 630. Using a mixer instead of tower reduces cost. Reducing the number of pumps reduces cost. Recirculating oil through the heater produces more constant heat transfer resulting in optimized temperature setpoint control. Level control fluctuations caused by well flow surges does not optimize heat transfer. This system allows for constant heat transfer, especially at lower than designed flowrates. Cooling of evaporation of gas cools off oil, which requires a constant addition of heat to compensate, recirculation allows maximum use of existing heating equipment. Multiple tanks allows for use of low differential eductor pumps.

Figure 7:
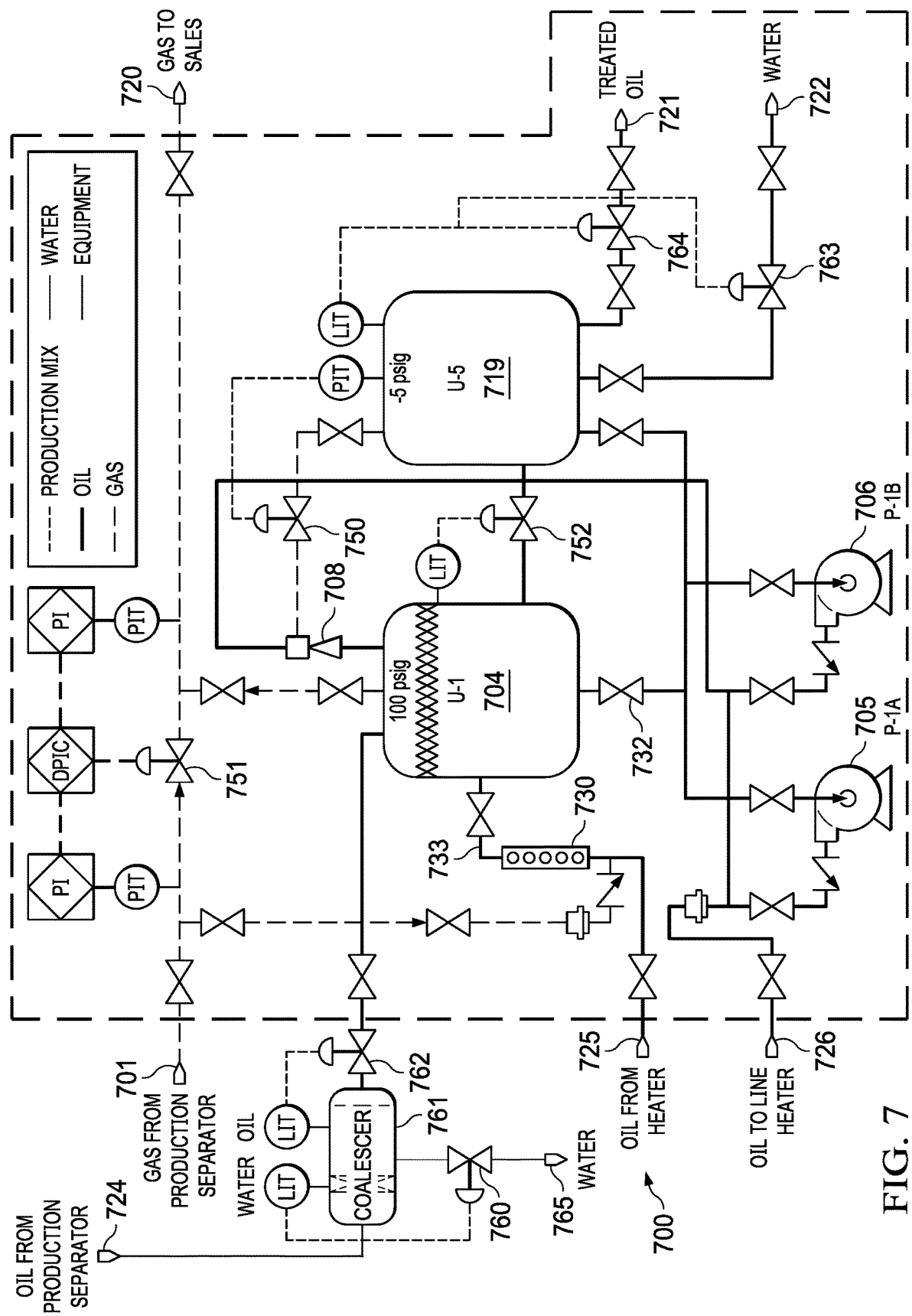
FIG. 7 depicts an example embodiment of a flow diagram of a high pressure oil treatment process utilizing a plurality of stabilizer vessels.

An example embodiment is disclosed in FIG. 7 of an oil separating process 700. The oil separating process 700 may include inputs of gas from a production separator 701, oil from production separator 724, and oil from line heater 725.

The outputs include sales gas to sales 720 and oil to line heater 726. The liquid hydrocarbons from the production separator 724 enters an oil coalescer 761 where water 765 is separated out of the oil via control valve 760 and the oil is fed into the first stage stabilizer vessel 704 via control valve 762.

The liquid production 732 circulates via stripping pumps 705 and 706 to an oil to line heater 726. Oil from the oil line heater 725 is then pumped through liquid gas mixer 730 that mixes the heated oil with virgin gas from first stage stabilizer vessel 704, liberating light hydrocarbons from solution through thermodynamic and mass transfer. The output 733 of the liquid gas mixer 730 is then reintroduced into the first stage stabilizer vessel 704.

Booster pumps 705 and 706 circulate the liquid 732 from the first stage stabilizer vessel 704 and the second stage stabilizer vessel 719 into a liquid-gas jet compressor 708, which compresses gas evolved from the second stage stabilizer vessel 719 up to sales gas pressure. The liquid in second stage stabilizer vessel 719 is controlled via a level control loop. Water 722 is removed from the second stage stabilizer vessel 719 via control valve 763. Treated oil 721 is removed from the second stage stabilizer vessel 719. Slip stream valve 751 controls pressure feeding the process. Valve 750 controls the pressure in the second stage stabilizer vessel 719. Valve 764 controls the level in the second stage stabilizer vessel 719. Valve 752 controls level in the first stage stabilizer vessel 704.

For purposes of understanding the drawings, PIT means "pressure indicator/transmitter." LIT means "level indicator/transmitter." PI means "pressure indicator." DPIC means "differential pressure indicator control." LC means "level control." TIT means "temperature indicator transmitter." FIT means "flow indicator/transmitter." AT mean "auxiliary transmitter," which may include a capacitance water cut meter.

Although the invention has been described in terms of embodiments which are set forth in detail, it should be understood that this is by illustration only and that the invention is not necessarily limited thereto. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. An apparatus for separating production fluids comprising:
    a three phase separator for separating a production fluid into a first oil output, a first gas output, and a first water output;
    a first flow control valve receiving the first gas output and generating a gas slipstream;
    a heater coupled to the first oil output, wherein the heater heats the first oil output to produce a heated second oil output; and
    a gas stripping column receiving the heated second oil output at the top and the gas slipstream at the bottom, wherein the heated oil is stripped of light hydrocarbons and any remaining water by the interaction of the slipstream flowing upwards through the heated second oil output falling downward to produce a third oil output and a second gas output.

2. The apparatus for separating production fluids of claim 1 further comprising a coalescer receiving the first water output, which generates a third gas output, a second water output, and a coalescer oil output that combines with the first oil output.

3. The apparatus for separating production fluids of claim 2 wherein the second water output is sent to a water treatment facility.

4. The apparatus for separating production fluids of claim 1 further comprising a flash tank receiving the third oil output, wherein the third oil output is let down to a lower pressure, resulting in residual light hydrocarbons to flash off and producing a fourth oil output.

5. The apparatus of separating production fluids of claim 4 further comprising a low pressure combustor for burning off the flash off of light hydrocarbons produced by the flash tank.

6. The apparatus for separating production fluids of claim 1 wherein the third oil output is sent to a flash pot before it is sent to the oil stripper column, resulting a flash off of light hydrocarbons to form a fourth gas output.

7. The apparatus for separating production fluids of claim 1 wherein the first gas output is combined with the second gas output and a third gas output to form a final gas product for a commercial metered gas pipeline.

8. The apparatus for separating production fluids of claim 1 wherein the third oil output is sent to a commercial metered oil pipeline.

9. The apparatus for separating production fluids of claim 1 further comprising a first pressure control valve coupled between the first gas output and the second gas output, wherein the first pressure control valve regulates the pressure within the gas stripping column.

10. The apparatus of separating production fluids of claim 1 further comprising a flash tank for receiving the third oil output, wherein the flash tank generates a fourth oil output and a third gas output.

11. The apparatus of separating production fluids of claim 1 further comprising a flash pot for receiving the heated second oil output, wherein the flash pot separates gas from the heated second oil output before it enters the gas stripping column.

12. The apparatus of separating production fluids of claim 1 further comprising a control valve on the gas stripper column for regulating the pressure within the gas stripper column.

* * * * *